(12) United States Patent
Gaal et al.

(10) Patent No.: US 11,050,598 B2
(45) Date of Patent: Jun. 29, 2021

(54) CARRIER INFORMATION SIGNALING IN A 5G NETWORK

(71) Applicant: QUALCOMM Incorporated, San Diego, CA (US)

(72) Inventors: Peter Gaal, San Diego, CA (US); Valentin Alexandru Gheorghiu, Tokyo (JP); Timo Ville Vintola, San Diego, CA (US); Hung Dinh Ly, San Diego, CA (US); Yang Yang, San Diego, CA (US); Jing Jiang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/199,958

(22) Filed: Nov. 26, 2018

(65) Prior Publication Data
US 2019/0165982 A1 May 30, 2019

Related U.S. Application Data

(60) Provisional application No. 62/591,732, filed on Nov. 28, 2017.

(51) Int. Cl.
*H04L 27/26* (2006.01)
*H04W 72/04* (2009.01)
*H04L 5/00* (2006.01)

(52) U.S. Cl.
CPC ........ *H04L 27/2657* (2013.01); *H04L 5/0007* (2013.01); *H04L 5/0091* (2013.01);
(Continued)

(58) Field of Classification Search
CPC .................. H04L 27/2657; H04W 72/042
See application file for complete search history.

(56) References Cited

U.S. PATENT DOCUMENTS 8,494,065 B2* 7/2013 Brehler ............... H04L 5/0037
375/260
9,820,281 B1* 11/2017 Werner ............... H04L 5/0007
(Continued)

OTHER PUBLICATIONS

Huawei et al., "On Bandwidth Part and Bandwidth Adaptation", 3GPP Draft; R1-1706900, 3rd Generation Partnership Project (3GPP), Mobile Competence Centre, 650, Route Des Lucioles, F-06921 Sophia-Antipolis Cedex, France vol. RAN WG1, No. Hangzhou, China; May 15, 2017-May 19, 2017 May 14, 2017, XP051272131 ,Retrieved from the Internet: URL:http://www.3gpp.org/ftp/Meetings_3GPP_SYNC/RAN1 /Docs/ [retrieved on May 14, 2017], 10 pages.
(Continued)

*Primary Examiner* — Parth Patel
(74) *Attorney, Agent, or Firm* — Harrity & Harrity, LLP

(57) ABSTRACT

Various aspects of the present disclosure generally relate to wireless communication. In some aspects, a user equipment may receive carrier information identifying at least one of: an initial absolute frequency for a carrier, a tone boundary offset value for the carrier, a number of resource blocks included in the carrier, or a frequency offset from a reference frequency; and determine a resource allocation of the carrier based at least in part on the carrier information and a subcarrier spacing of the user equipment. Numerous other aspects are provided.

38 Claims, 9 Drawing Sheets

(52) U.S. Cl.
CPC ...... *H04L 27/2602* (2013.01); *H04L 27/2662* (2013.01); *H04L 27/2666* (2013.01); *H04W 72/042* (2013.01); *H04L 5/001* (2013.01)

(56) References Cited

U.S. PATENT DOCUMENTS

| | | | | |
|---|---|---|---|---|
| 10,447,444 B2* | 10/2019 | Islam | | H04W 52/36 |
| 10,498,513 B2* | 12/2019 | Marinier | | H04L 5/0053 |
| 10,499,398 B2* | 12/2019 | Majmundar | | H04W 72/046 |
| 10,547,417 B2* | 1/2020 | Kim | | H04L 5/001 |
| 10,721,041 B2* | 7/2020 | Au | | H04L 5/003 |
| 2012/0014330 A1* | 1/2012 | Damnjanovic | | H04L 5/003 |
| | | | | 370/329 |
| 2016/0043842 A1* | 2/2016 | Gong | | H04L 5/0048 |
| | | | | 370/329 |
| 2017/0064692 A1* | 3/2017 | Kahtava | | H04L 5/0044 |
| 2017/0086153 A1* | 3/2017 | Yoon | | H04W 56/001 |
| 2018/0070348 A1* | 3/2018 | Ouchi | | H04L 5/0053 |
| 2018/0145818 A1* | 5/2018 | Choi | | H04L 5/023 |
| 2018/0192383 A1* | 7/2018 | Nam | | H04J 11/0073 |
| 2018/0227929 A1* | 8/2018 | Yoo | | H04B 7/0617 |
| 2018/0368116 A1* | 12/2018 | Liao | | H04L 5/0053 |
| 2019/0028315 A1* | 1/2019 | Park | | H04L 27/2657 |
| 2019/0069256 A1* | 2/2019 | Jung | | H04W 72/0453 |
| 2019/0074886 A1* | 3/2019 | Yoon | | H04B 17/318 |
| 2019/0081714 A1* | 3/2019 | Xiang | | H04W 24/10 |
| 2019/0081752 A1* | 3/2019 | Hunukumbure | | H04W 72/0453 |
| 2019/0109695 A1* | 4/2019 | Kim | | H04L 27/2613 |
| 2019/0132103 A1* | 5/2019 | Yang | | H04L 25/0226 |
| 2019/0132109 A1* | 5/2019 | Zhou | | H04L 5/0098 |
| 2019/0140807 A1* | 5/2019 | Wang | | H04W 72/042 |
| 2019/0149383 A1* | 5/2019 | Ko | | H04W 72/04 |
| | | | | 370/329 |
| 2019/0150190 A1* | 5/2019 | Kim | | H04W 74/08 |
| | | | | 370/329 |
| 2019/0150197 A1* | 5/2019 | Sheu | | H04W 74/0816 |
| 2019/0165982 A1* | 5/2019 | Gaal | | H04L 5/0091 |
| 2019/0173612 A1* | 6/2019 | Kimura | | H04W 1/1819 |
| 2019/0173653 A1* | 6/2019 | Wu | | H04L 27/2607 |
| 2019/0174323 A1* | 6/2019 | Go | | H04W 16/12 |
| 2019/0182856 A1* | 6/2019 | Moroga | | H04L 5/0007 |
| 2019/0215110 A1* | 7/2019 | Yang | | H04L 5/00 |
| 2019/0223124 A1* | 7/2019 | Tang | | H04W 72/0453 |
| 2019/0223186 A1* | 7/2019 | Liu | | H04W 72/0453 |
| 2019/0245727 A1* | 8/2019 | Park | | H04L 27/2607 |
| 2019/0261367 A1* | 8/2019 | Wu | | H04L 5/0094 |
| 2019/0268198 A1* | 8/2019 | Oketani | | H04L 27/2605 |
| 2019/0306860 A1* | 10/2019 | Ciochina | | H04W 72/12 |
| 2019/0349124 A1* | 11/2019 | Tang | | H04B 17/30 |
| 2019/0349943 A1* | 11/2019 | Wu | | H04W 76/27 |
| 2019/0356460 A1* | 11/2019 | Tsuboi | | H04W 48/16 |
| 2019/0372730 A1* | 12/2019 | Zhang | | H04L 5/0044 |
| 2020/0052939 A1* | 2/2020 | Xiong | | H04L 5/0026 |
| 2020/0068624 A1* | 2/2020 | Xu | | H04W 74/0833 |
| 2020/0084733 A1* | 3/2020 | Palenius | | H04W 72/0473 |
| 2020/0145961 A1* | 5/2020 | Harada | | H04W 72/005 |
| 2020/0177334 A1* | 6/2020 | Song | | H04L 5/00 |
| 2020/0187093 A1* | 6/2020 | Awad | | H04W 72/005 |
| 2020/0274750 A1* | 8/2020 | Yi | | H04L 27/2613 |
| 2020/0275523 A1* | 8/2020 | Zhang | | H04B 7/0626 |
| 2020/0280984 A1* | 9/2020 | Yi | | H04W 72/0453 |
| 2020/0288507 A1* | 9/2020 | Chang | | H04W 72/1273 |
| 2020/0296656 A1* | 9/2020 | Amuru | | H04W 48/12 |
| 2020/0314946 A1* | 10/2020 | Tsuboi | | H04W 8/24 |
| 2020/0383103 A1* | 12/2020 | Zhou | | H04L 5/005 |

OTHER PUBLICATIONS

Intel Corporation: "Bandwidth Parts Configuration and Operations", 3GPP Draft, R1-1707420, 3rd Generation Partnership Project (3GPP), Mobile Competence Centre, 650, Route Des Lucioles, F-06921 Sophia-Antipolis Cedex, France vol. RAN WG1, No. Hangzhou, China, May 15, 2017-May 19, 2017, May 14, 2017 (May 14, 2017), XP051272629, pp. 1-6, Retrieved from the Internet: URL:http://www.3gpp.org/ftp/Meetings_3GPP SYNC/RAN1/Docs/ [retrieved on May 14, 2017].

Intel Corporation: "NR PBCH Content", 3GPP Draft; R1-1712525 PBCH Content, 3rd Generation Partnership Project (3GPP), Mobile Competence Centre, 650, Route Des Lucioles, F-06921 Sophia-Antipolis Cedex, France vol. RAN WG1, No. Prague, Czech Republic; Aug. 21, 2017-Aug. 25, 2017 Aug. 20, 2017 (Aug. 20, 2017), XP051315341, Retrieved from the Internet: URL:http://www.3gpp.org/ftp/Meetings_3GPP_SYNC/RAN1/Docs/ [retrieved on Aug. 20, 2017], 5 pages.

International Search Report and Written Opinion—PCT/US2018/062592—ISA/EPO—dated Jan. 31, 2019.

Qualcomm Incorporated: "Synchronization Signal bandwidth and Multiplexing Consideration",3GPP Draft; R1-1700784 Synchronization Signal bandwidth and Multiplexing Consideration, 3rd Generation Partnership Project (3GPP), Mobile Competence Centre, 650, Route Des Lucioles, F-06921 Sophia-Antipolis Cedex, France vol. RAN WG1, No. Spokane, USA; Jan. 16, 2017-Jan. 20, 2017 Jan. 16, 2017 (Jan. 16, 2017), XP051208305, Retrieved from the Internet:URL:http://www.3gpp.org/ftp/Meetings_3GPP_SYNC/RAN1/Docs/[retrieved on Jan. 16, 2017], 8 pages.

* cited by examiner

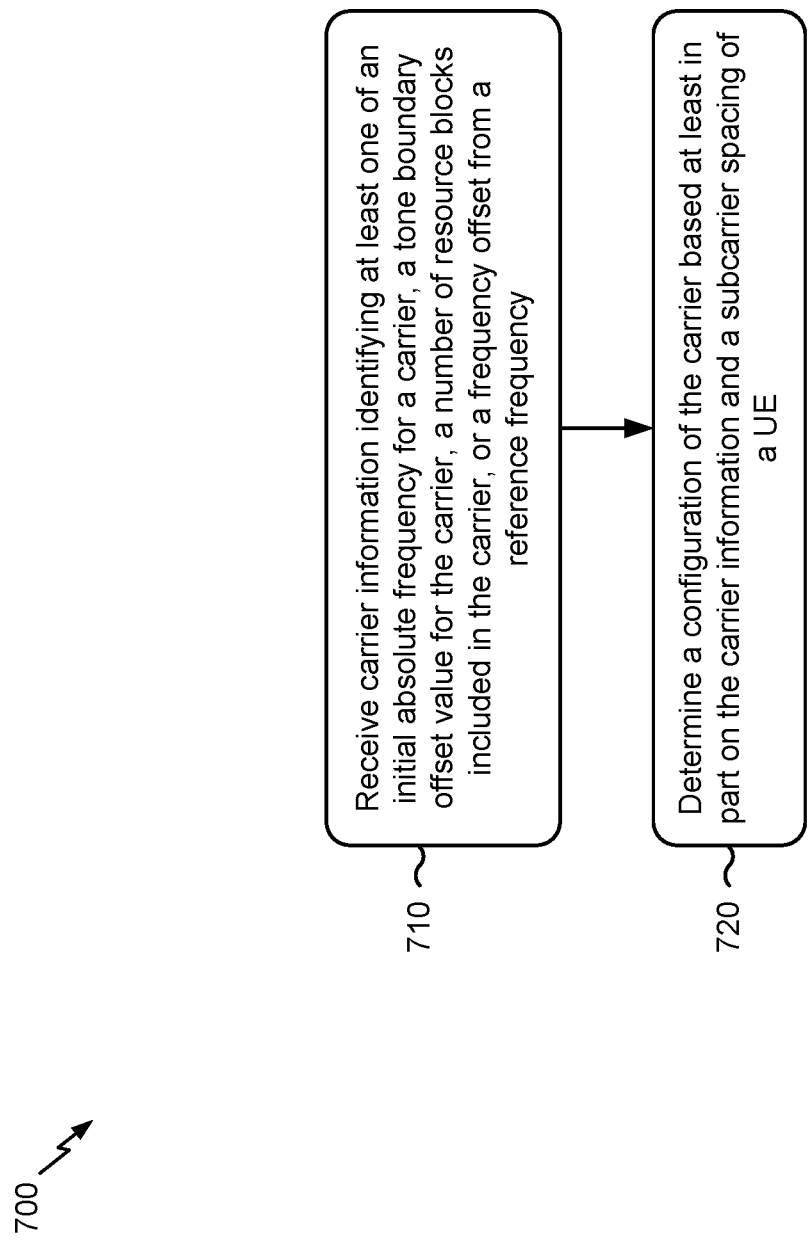

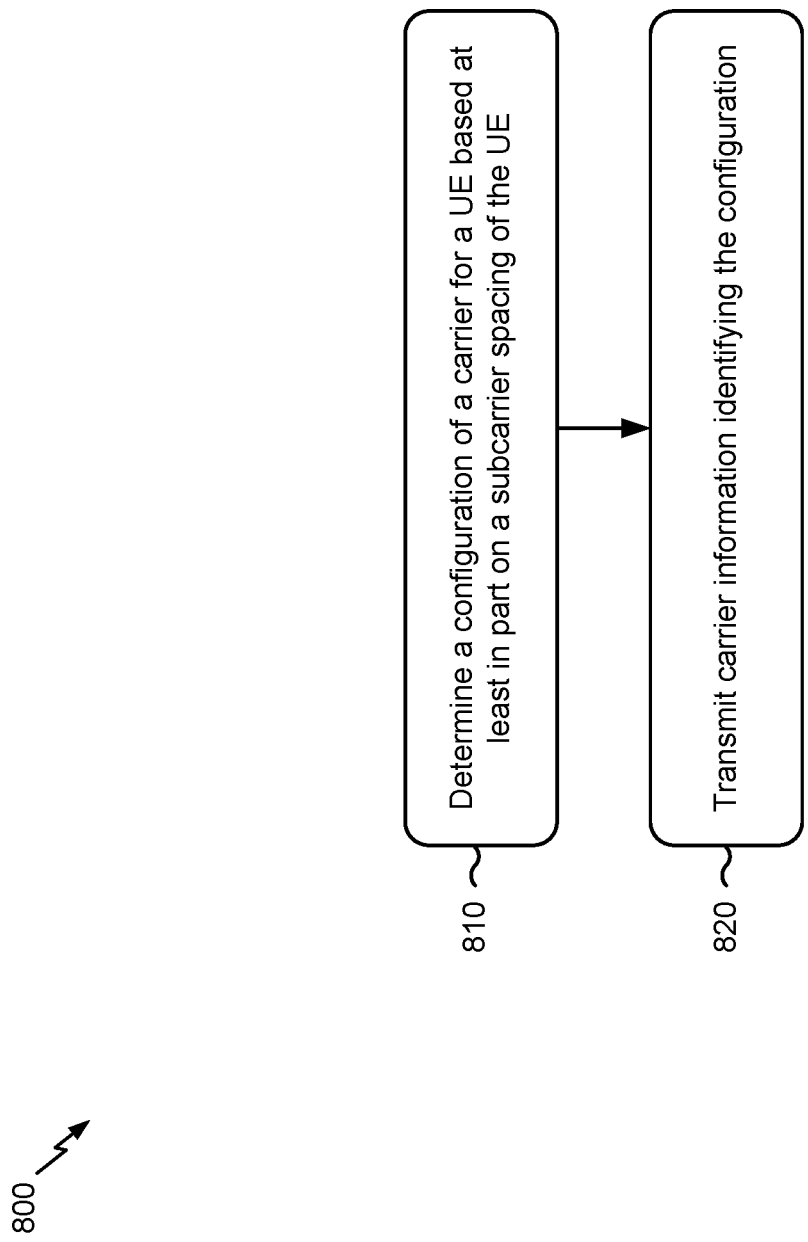

CARRIER INFORMATION SIGNALING IN A 5G NETWORK

CROSS-REFERENCE TO RELATED APPLICATIONS UNDER 35 U.S.C. § 119

This application claims priority to Provisional Patent Application No. 62/591,732, filed on Nov. 28, 2017, entitled "TECHNIQUES AND APPARATUSES FOR CARRIER INFORMATION SIGNALING IN A 5G NETWORK" which is hereby expressly incorporated by reference herein.

FIELD OF THE DISCLOSURE

Aspects of the present disclosure generally relate to wireless communication, and more particularly to techniques and apparatuses for carrier information signaling in a 5G network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include receiving carrier information identifying at least one of: an initial absolute frequency for a carrier, a tone boundary offset value for the carrier, a number of resource blocks included in the carrier, or a frequency offset from a reference frequency; and determining a configuration of the carrier based at least in part on the carrier information and a subcarrier spacing of the user equipment.

In some aspects, a user equipment for wireless communication may include memory and at least one processor operatively coupled to the memory. The memory and the at least one processor may be configured to receive carrier information identifying at least one of: an initial absolute frequency for a carrier, a tone boundary offset value for the carrier, a number of resource blocks included in the carrier, or a frequency offset from a reference frequency; and determine a configuration of the carrier based at least in part on the carrier information and a subcarrier spacing of the user equipment.

In some aspects, a non-transitory computer-readable medium may store one or more instructions for wireless communication. The one or more instructions, when executed by one or more processors of a user equipment, may cause the one or more processors to receive carrier information identifying at least one of: an initial absolute frequency for a carrier, a tone boundary offset value for the carrier, a number of resource blocks included in the carrier, or a frequency offset from a reference frequency; and determine a configuration of the carrier based at least in part on the carrier information and a subcarrier spacing of the user equipment.

In some aspects, an apparatus for wireless communication may include means for receiving carrier information identifying at least one of: an initial absolute frequency for a carrier, a tone boundary offset value for the carrier, a number of resource blocks included in the carrier, or a frequency offset from a reference frequency; and means for determining a configuration of the carrier based at least in part on the carrier information and a subcarrier spacing of the apparatus.

In some aspects, a method of wireless communication performed by a base station may include determining a configuration of a carrier for a user equipment (UE) based at least in part on a subcarrier spacing of the UE; and transmitting carrier information identifying the configuration, wherein the carrier information includes at least one of: an initial absolute frequency for the carrier, a tone boundary offset value for the carrier, a number of resource blocks included in the carrier, or a frequency offset from a reference frequency.

In some aspects, a base station for wireless communication may include memory and at least one processor operatively coupled to the memory. The memory and the at least one processor may be configured to determine a configuration of a carrier for a user equipment (UE) based at least in part on a subcarrier spacing of the UE; and transmit carrier information identifying the configuration, wherein the carrier information includes at least one of: an initial absolute frequency for the carrier, a tone boundary offset value for the carrier, a number of resource blocks included in the carrier, or a frequency offset from a reference frequency.

In some aspects, a non-transitory computer-readable medium may store one or more instructions for wireless communication. The one or more instructions, when executed by one or more processors of a base station, may cause the one or more processors to determine a configuration of a carrier for a user equipment (UE) based at least in part on a subcarrier spacing of the UE; and transmit carrier information identifying the configuration, wherein the carrier information includes at least one of: an initial absolute frequency for the carrier, a tone boundary offset value for the carrier, a number of resource blocks included in the carrier, or a frequency offset from a reference frequency.

In some aspects, an apparatus for wireless communication may include means for determining a configuration of a carrier for a user equipment (UE) based at least in part on a subcarrier spacing of the UE; and means for transmitting carrier information identifying the configuration, wherein the carrier information includes at least one of: an initial absolute frequency for the carrier, a tone boundary offset value for the carrier, a number of resource blocks included in the carrier, or a frequency offset from a reference frequency.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a user equipment (UE), in accordance with various aspects of the present disclosure.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
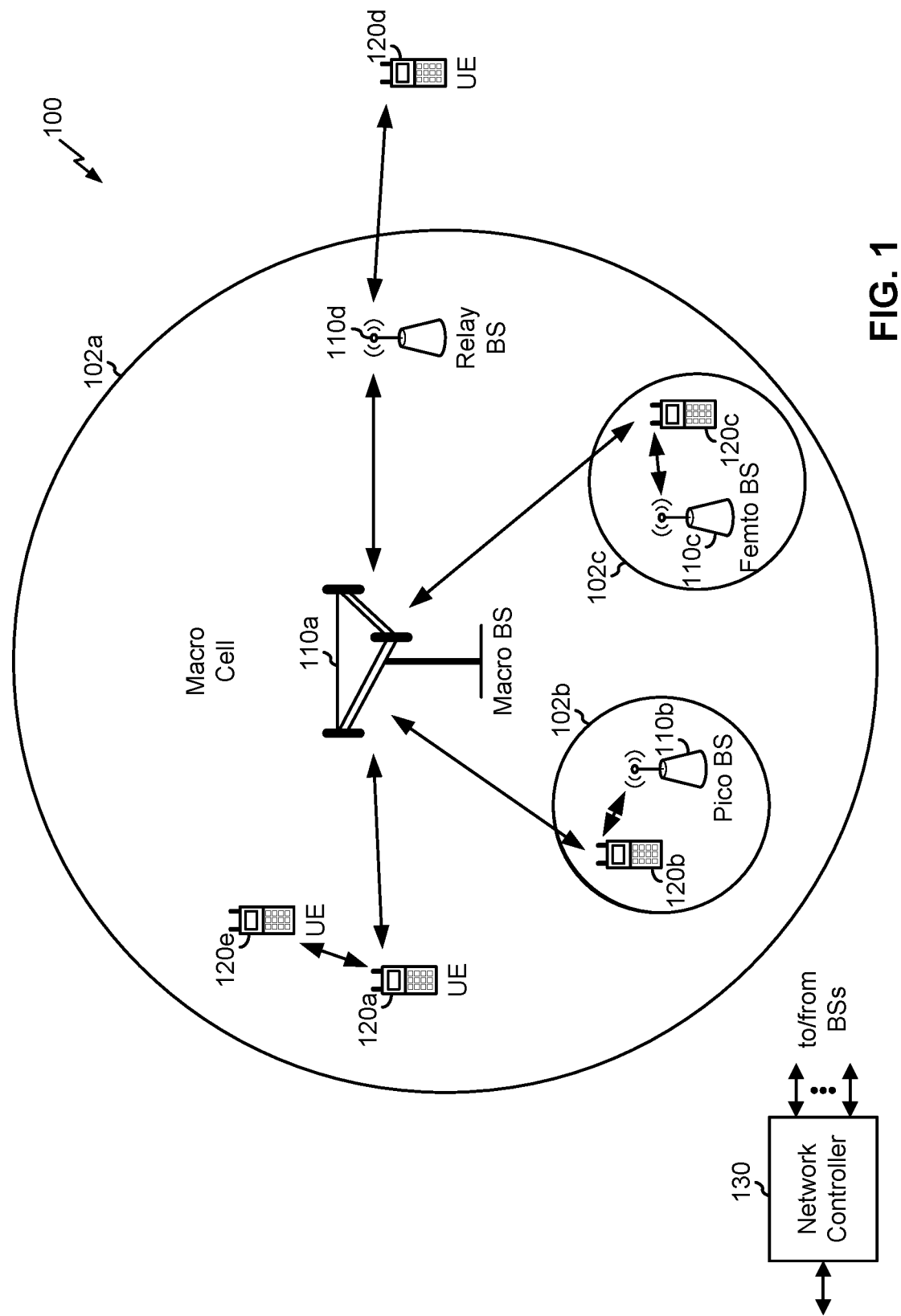
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
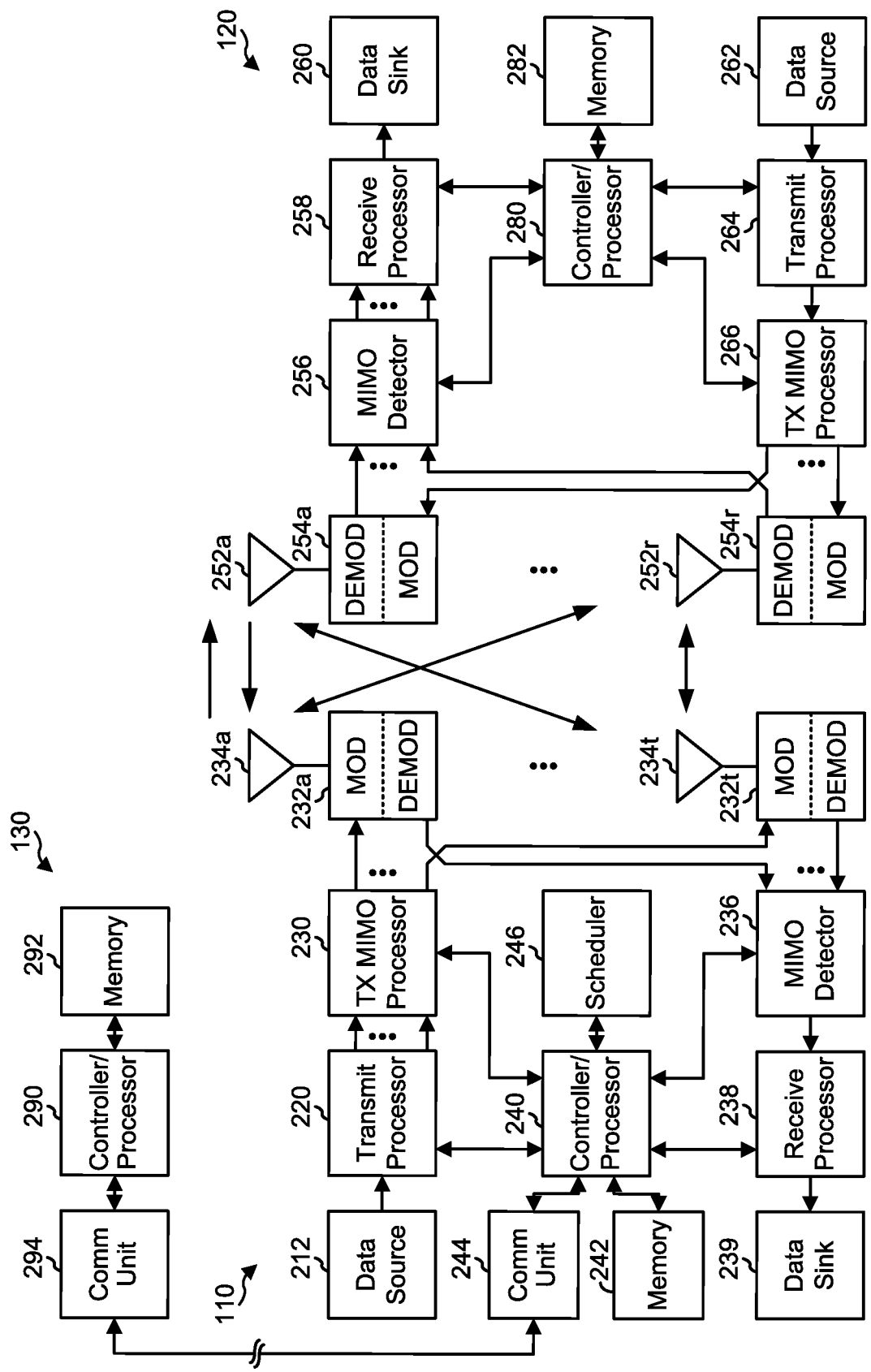
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with carrier information signaling in a 5G network, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving carrier information; means for determining a resource allocation of the carrier based at least in part on the carrier information and a subcarrier spacing; means for determining, based at least in part on the reference frequency, at least one of: a pseudo-noise sequence for the carrier, a resource block group for the carrier, a precoder resource block granularity for the carrier, or a location of a sounding reference signal for the carrier; means for determining a bandwidth part based at least in part on the carrier information and based at least in part on information identifying at least one of a starting resource block of the bandwidth part or an ending resource block of the bandwidth part; means for receiving uplink carrier information for an uplink carrier; means for determining a resource allocation of the uplink carrier based at least in part on the uplink carrier information; and/or the like. In some aspects, such means may include one or more components of UE 120 described in connection with FIG. 2.

In some aspects, BS 110 may include means for determining a resource allocation of a carrier for a UE based at least in part on a subcarrier spacing of the UE; means for transmitting carrier information identifying the resource allocation; means for transmitting information identifying at least one of a starting resource block of a bandwidth part or an ending resource block of the bandwidth part, wherein the carrier information is for the bandwidth part; means for transmitting uplink carrier information for an uplink carrier; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3A:
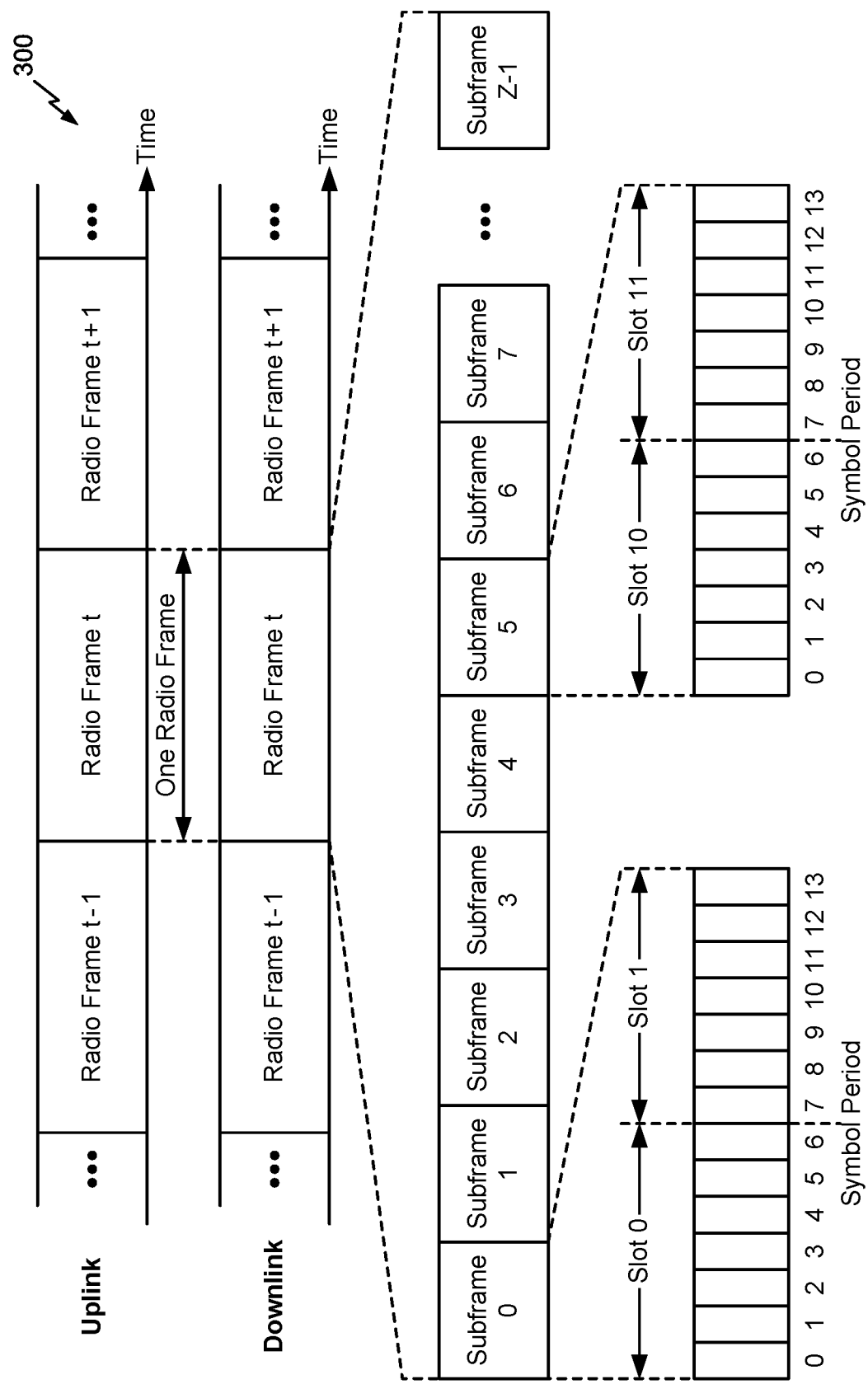
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
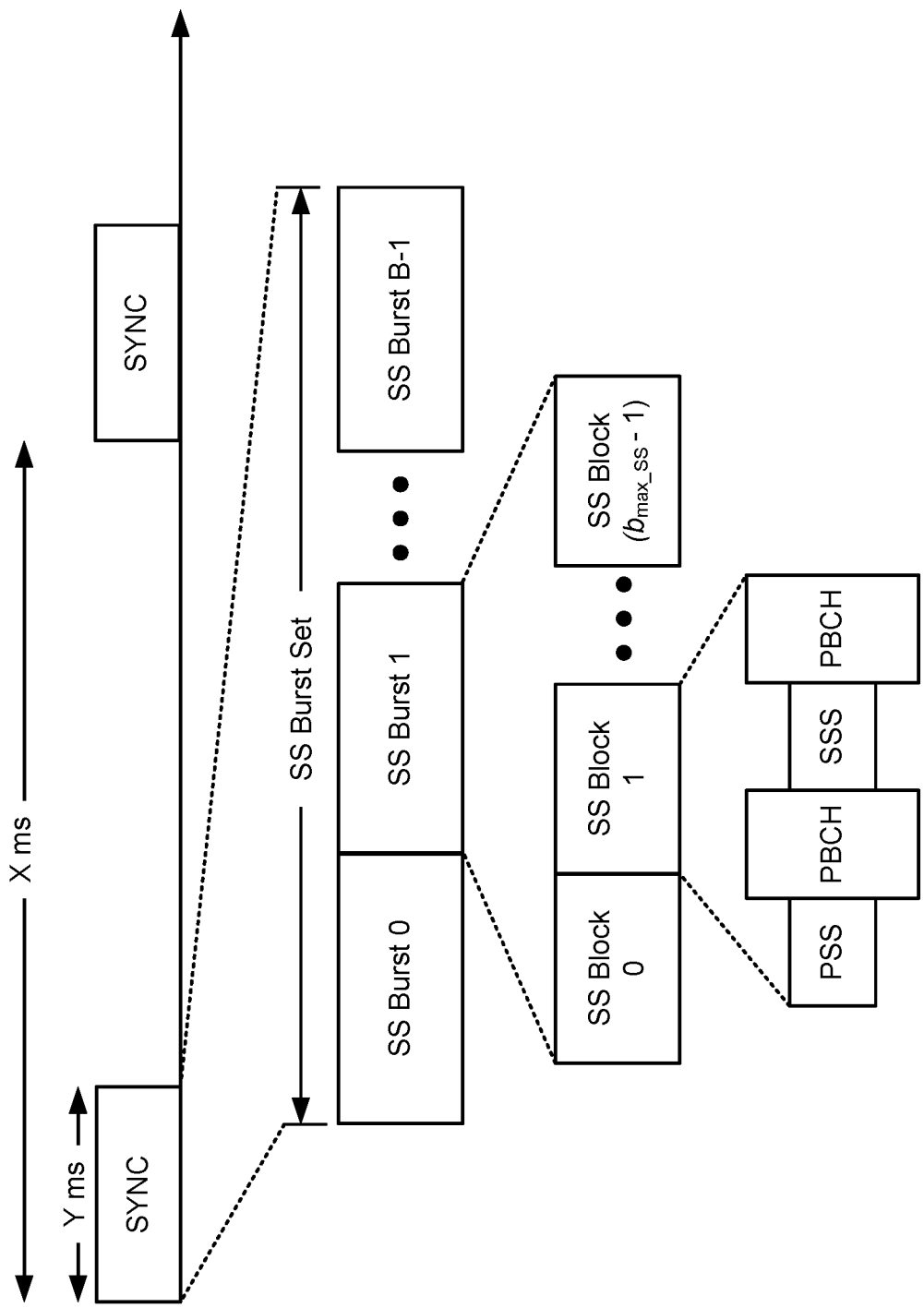
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
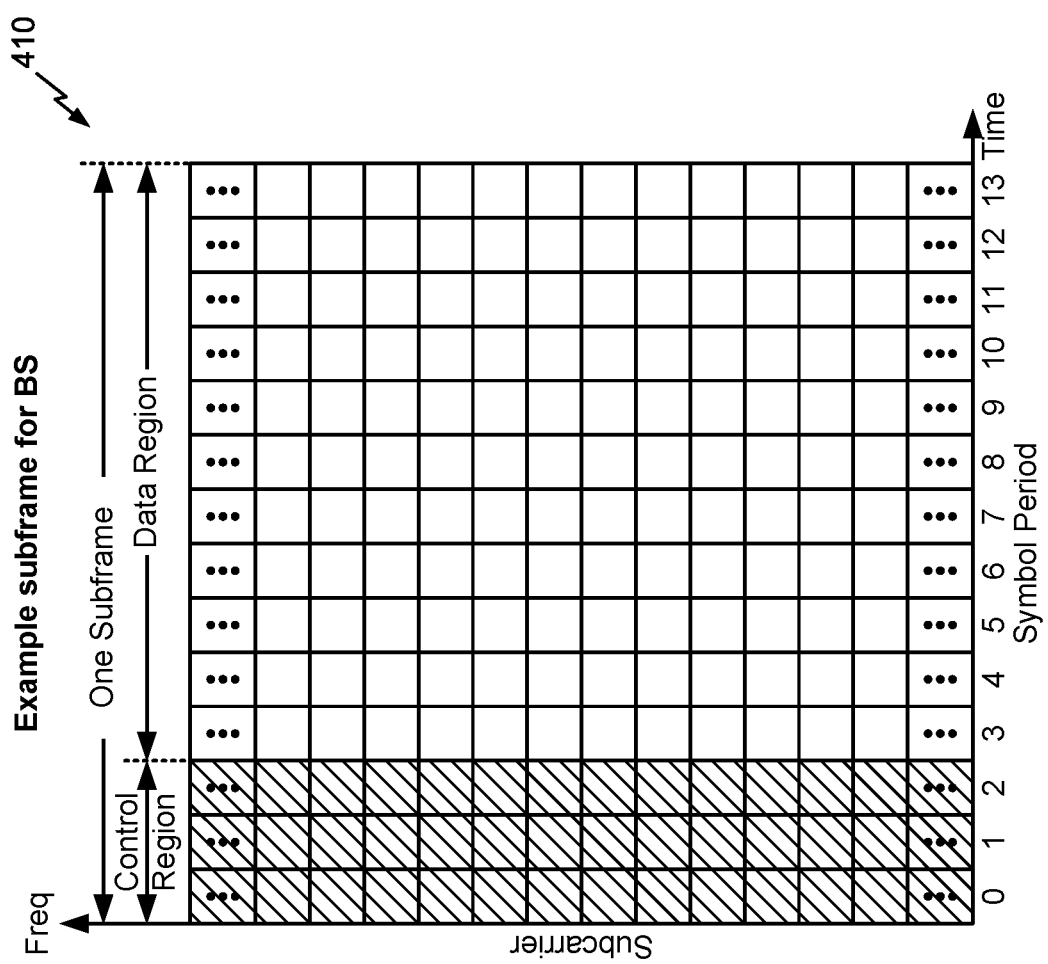
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In 5G (e.g., NR), a BS (e.g., BS 110) may configure a carrier (e.g., a component carrier, a DL carrier, an UL carrier) and/or a bandwidth part (BWP) of a carrier for a UE (e.g., UE 120). 5G may provide increased flexibility in configuring the carrier relative to some other radio access technologies (RATs). For example, the UE may be capable of using a flexible bandwidth allocation, and a carrier and/or BWP for the UE may be assigned based at least in part on demand for bandwidth, traffic considerations, and/or the like. Also, different UEs may use different subcarrier spacings (e.g., numerologies, tone spacings, etc.), which may lead to increased flexibility in configuration of carriers and/or BWPs.

A resource allocation for a carrier or BWP may be defined by various parameters, which are described in more detail in connection with FIG. 5, below. However, it may be inefficient for a BS to signal all of the various parameters to a UE, particularly since many of the parameters are interrelated. For example, a UE may need only a subset of the parameters to determine the resource allocation for a particular carrier or BWP.

Some techniques and apparatuses described herein provide signaling of carrier information identifying parameters for a configuration of a carrier for a UE. For example, the carrier information may include a subset of possible parameters (e.g., not all possible parameters) regarding the carrier. The UE may use the carrier information to determine the configuration. In this way, a subset of possible parameters are provided to a UE for determination of a configuration for a carrier of the UE, thereby conserving UE, BS, and network resources that would otherwise be used to provide a larger set of parameters.

Figure 5:
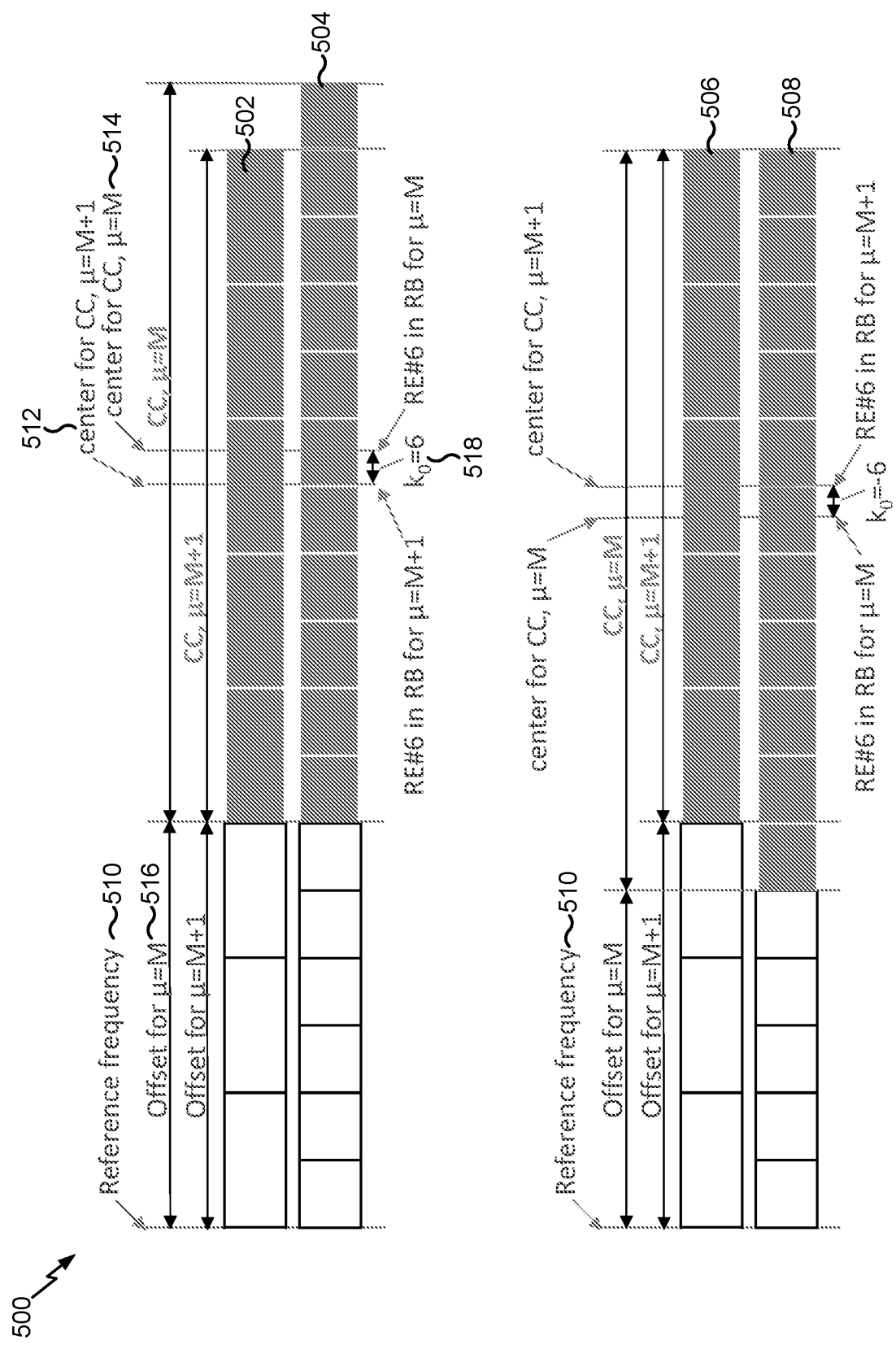
FIG. 5 is a diagram illustrating an example of carriers for a 5G UE, in accordance with various aspects of the present disclosure.

FIG. 5 is a diagram illustrating an example 500 of carriers having odd numbers of RBs and even numbers of RBs for a 5G UE (e.g., UE 120), in accordance with various aspects of the present disclosure. In FIG. 5, carriers 502, 504, 506, and 508 are described, and are shown in FIG. 5 using shaded blocks. In FIG. 5, μ represents a subcarrier spacing, tone spacing, or numerology of a corresponding carrier, and may have a value of M, M+1, and/or the like. M is an integer. A single increment of M may correspond to a two-fold increase in μ. For example, M=0 may correspond to a subcarrier spacing of 15 kHz, M=1 may correspond to a subcarrier spacing of 30 kHz, and so on. As can be seen, carriers 502 and 506 are associated with μ=M+1, and carriers 504 and 508 are associated with μ=M. In some aspects, carriers 502 through 508 may be component carriers. Additionally, or alternatively, carriers 502 through 508 may be bandwidth parts.

As shown by reference number 510, carriers 502 through 508 may be associated with a reference frequency. The reference frequency may be identified by a synchronization signal block (SS block or SSB) received by the UE. For example, the reference frequency may be identified by a physical broadcast channel of the SSB. In some aspects, a location of the reference frequency may be defined by the product of an integer and a subcarrier spacing value (e.g., 15 kHz for sub-6 GHz or 60 kHz for mm Wave), in relation to a channel raster point. For example, the reference frequency location may be defined as 4*15 kHz from a channel raster point in a sub-6 GHz system. The reference frequency location may be identical for different subcarrier spacings. For example, as can be seen, carriers associated with μ=M may have a same reference frequency location as carriers associated with μ=M+1.

As shown in FIG. 5, and by reference number 512, carrier 502 may be associated with a carrier center frequency. For example, the carrier center frequency may be located at a center of carrier 502, shown here as resource element (RE) number 6 of a center resource block of carrier 502. As shown by reference number 514, carrier 504 may be associated with a carrier center frequency that is different than the carrier center frequency of carrier 502, shown here as RE number 6 of a center resource block of carrier 504. This may be because carrier 504 has a wider bandwidth than carrier 502.

The left edges of carriers 502 through 508, as shown in FIG. 5, may correspond to a lowest frequency (e.g., a lowest resource element (RE) of a lowest resource block (RB)) of the carriers. In some aspects, the left edges may be referred to as a channel start or a channel edge. The right edges of carriers 502 through 508, as shown in FIG. 5, may correspond to a highest frequency (e.g., a highest resource element (RE) of a highest resource block (RB)) of the carriers. In some aspects, the right edges may be referred to as a channel end or a channel edge. As can be seen, in some aspects, a channel start and/or a channel end may be different for different values of µ. In some aspects, a channel start and/or channel end may be located on a valid channel raster point. A channel raster may identify a frequency grid for channels of a band. In some aspects, a channel start and/or a channel end may be located on a point defined by the channel raster. For example, in a 15 kHz subcarrier spacing, the channel raster may define points every 15 kHz offset from a particular starting frequency, which may be equal to the reference frequency described in connection with reference number 510.

As shown by reference number 516, carrier 504 (and the other carriers 502, 506, 508) may be associated with a frequency offset from the reference frequency. In some aspects, the frequency offset may be measured between the reference frequency location and a channel start of a carrier. In some aspects, the frequency offset may be defined as an integer number of RBs. In some aspects, the frequency offset may be different for different subcarrier spacings. For example, for carrier 502, the frequency offset may be 3 RBs, and for carrier 504, the frequency offset may be 6 RBs.

In some aspects, the reference frequency location may be further away from the channel edge than a maximum supported channel bandwidth. For example, assume that the UE has a maximum supported channel bandwidth of 40 MHz, and assume that the carrier of the UE is a 40 MHz carrier. In such a case, the reference frequency used to identify the carrier may be located more than 40 MHz away from a channel edge of the carrier. This may provide forward compatibility for larger bandwidths than 40 MHz.

As shown by reference number 518, a carrier may be associated with a value indicating a tone offset from the DC of the carrier to the RB boundary, which may be referred to herein as a tone boundary offset value, denoted by $k_0$. The tone boundary offset value may be equal to a number of tones (e.g., REs) between a center of a component carrier and an edge of the RB. In other words, the tone boundary offset value may identify a direct current (DC) offset from an RB boundary of the UE in the corresponding carrier. For example, for carriers 502 and 504, the tone boundary offset value is equal to 6. Note that the tone boundary offset value is not necessarily an offset from the center of one carrier to the center of the other—the arrow for the tone boundary offset value is situated between the center lines of the carriers coincidentally in FIG. 5. The UE may use the tone boundary offset value to identify edges of RBs in a case wherein the tone boundary of an RB is offset from a DC subcarrier.

In some aspects, a carrier may include a particular number of RBs. For example, carrier 502 includes 5 RBs and carrier 504 includes 11 RBs. The number of RBs may be determined by a scheduling entity. In some aspects, the number of RBs may not be exactly proportionate to the subcarrier spacing. For example, the number of RBs may not necessarily be doubled when comparing µ=M and µ=M+1.

In some aspects, a carrier may be associated with a channel number. A channel number may point to a frequency corresponding to $k+k_0$, as defined in 3GPP Technical Specification 38.211. The channel number may point to a valid channel raster point. In some aspects, the channel number may not correspond to a midpoint of the channel for every subcarrier spacing. In some aspects, the channel number may be equal for different subcarrier spacings. In some aspects, a channel number may be used when switching from one RAT to another RAT (e.g., in a non-standalone deployment).

Some of the parameters described above may be dependent on each other, and some of the parameters described above may be independent from each other. For example, the channel number of a carrier may be independent from a subcarrier spacing of the carrier. In some aspects, the $k_0$ of a carrier may be related to the subcarrier spacing of the carrier. In some aspects, the number of RBs of a carrier may be related to the subcarrier spacing of the carrier. Additionally, or alternatively, the frequency offset of a carrier may be a function of the subcarrier spacing of the carrier. Techniques and apparatuses described herein provide a subset of the parameters (e.g., a subset of frequency offset, channel start, channel end, channel center, channel number, $k_0$, number of RBs, and reference frequency location) to enable the UE to determine a resource allocation of a carrier (e.g., using relationships between the parameters that are provided and parameters that are not provided). In this way, resources are conserved in comparison to providing an entirety of the parameters for a carrier.

Carriers 502 through 508 each include an odd number of RBs. In some aspects, a carrier may include an even number of RBs. In such a case, a $k_0$ value of the carrier may be equal to 0, since no phase boundary offset is present in a carrier with an even number of RBs.

As indicated above, FIG. 5 is provided as an example. Other examples are possible and may differ from what was described with respect to FIG. 5.

Figure 6:
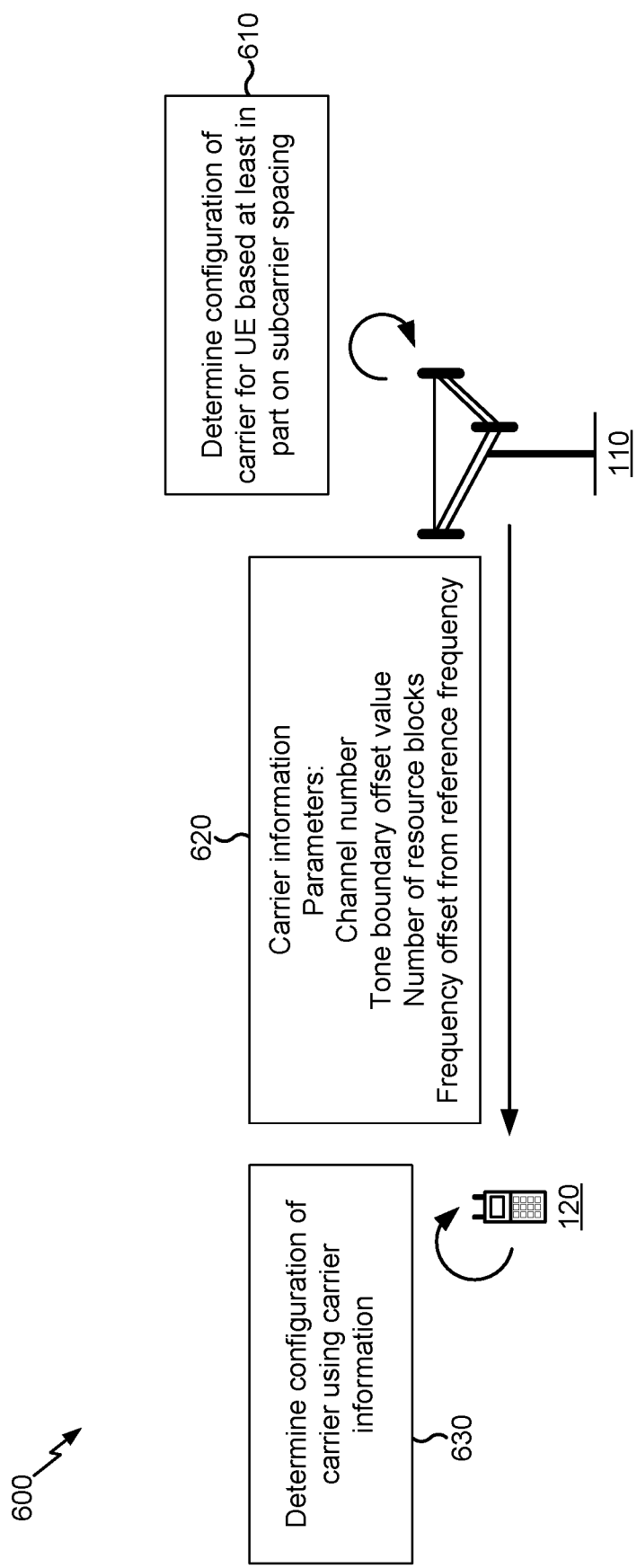
FIG. 6 is a diagram illustrating an example of carrier information signaling in a 5G network, in accordance with various aspects of the present disclosure.

FIG. 6 is a diagram illustrating an example 600 of carrier information signaling in a 5G network, in accordance with various aspects of the present disclosure.

As shown in FIG. 6, and by reference number 610, a BS 110 may determine a configuration of a carrier for a UE 120. In some aspects, the configuration may be referred to herein as a resource allocation. For example, the BS 110 may determine a bandwidth of the carrier (e.g., a number of RBs and/or the like), a frequency location of the carrier (e.g., based at least in part on spectral utilization), and/or the like. The BS 110 may determine the configuration based at least in part on a subcarrier spacing of the UE 120. For example, the UE 120 may be associated with a particular subcarrier spacing, and the BS 110 may determine the configuration based at least in part on the particular subcarrier spacing.

As shown by reference number 620, the BS 110 may provide carrier information to the UE 120. The carrier information may be used by the UE 120 to identify the configuration. Here, the carrier information includes one or more parameters, such as a channel number, a tone boundary offset value (e.g., $k_0$), a number of resource blocks, and a frequency offset from a reference frequency. For example, the channel number may include an identifier of a physical channel, such as an index value corresponding to the physical channel. The tone boundary offset value may identify a tone boundary offset of the carrier. The number of resource blocks may identify a number of resource blocks included in the carrier. The frequency offset may identify an offset (e.g., in terms of a number of RBs) from a reference frequency to the carrier (e.g., to a channel start of the carrier). In some aspects, the carrier information may include all of the above-identified parameters. In some aspects, the carrier information may include a subset of the above-identified parameters (i.e., fewer than all of the above-identified parameters), such as the tone boundary offset value, the number of resource blocks, and the frequency offset. In some aspects, the carrier information may include one or more of the above-identified parameters in a particular case. For example, in the case when a UE is to be handed over from one RAT to another, the carrier information may include the channel number. In some aspects, the carrier information may include one or more parameters that are different from the above-identified parameters.

As shown by reference number 630, the UE 120 may determine the configuration of the carrier using the carrier information. For example, the UE 120 may know the subcarrier spacing (e.g., based at least in part on configuration of the UE 120) and the reference frequency (e.g., based at least in part on a synchronization signal block or PBCH received by the UE 120). The UE 120 may determine the configuration of the carrier using the carrier information. Various examples of determination of the configuration of the carrier are provided below.

In some aspects, the UE 120 may use the subcarrier spacing, the reference frequency, and the frequency offset to identify a location of a channel start of the carrier. For example, the UE 120 may offset a number of RBs, with a bandwidth determined according to the subcarrier spacing, from the reference frequency to determine the channel start. In some aspects, the UE 120 may use the reference frequency to determine at least one of a pseudo-noise sequence for reference signals used after configuration (e.g., radio resource control (RRC) configuration) of the UE 120, a RB group (RBG) of the UE 120, a precoder RB (PRB) granularity of the UE 120, and/or a location of a sounding reference signal (SRS) of the UE 120. In such a case, a channel start and/or a channel end of the carrier need not be aligned with the RBG, the PRG, or the SRS. In this way, different UEs that are configured with different bandwidths may share commonly-configured sequences and/or the like.

In some aspects, the UE 120 may use the channel number to determine the configuration. For example, the UE 120 may identify a center frequency or an identity of a channel in which the carrier is allocated according to the channel number.

In some aspects, the UE 120 may use the number of RBs to identify the channel end of the carrier and/or a bandwidth of the carrier. For example, the UE 120 may identify the channel end according to an offset, from the channel start, that is identified by the number of RBs of the carrier.

In some aspects, the UE 120 may use the tone boundary offset value to determine the configuration. For example, in a situation where the carrier includes an odd number of RBs, the UE 120 may use the tone boundary offset value to determine the tone boundary offset.

In some aspects, the carrier information may refer to a bandwidth part. For example, the UE 120 may determine a configuration of a bandwidth part associated with the carrier identified by the carrier information. In such a case, the BS 110 may provide information identifying a starting RB and an ending RB of the bandwidth part within the carrier. For example, the starting RB and/or the ending RB can be defined relative to the carrier, or relative to the reference frequency.

In some aspects, the UE 120 may be associated with frequency division duplexing (FDD). In such a case, different sets of parameters can be signaled for a downlink carrier than for an uplink carrier. For example, different sets of parameters may be signaled when the subcarrier spacing is different for the downlink carrier than for the uplink carrier. Additionally, or alternatively, different sets of parameters may be signaled when the channel bandwidth is different for the downlink carrier than for the uplink carrier. When the channel bandwidth and subcarrier spacings of the downlink carrier and the uplink carrier are equal, the BS 110 may indicate only a channel number of the uplink carrier in addition to the parameters of the downlink carrier.

In some aspects, the UE 120 may be associated with time division duplexing (TDD). In such a case, the channel number of the downlink carrier may be equal to the channel number of the uplink carrier. In some aspects, the BS 110 may signal a different number of RBs for the downlink carrier than for the uplink carrier (e.g., when the downlink carrier is associated with a different number of RBs than the uplink carrier).

In some aspects, the BS 110 and the UE 120 may perform off-raster synchronization. For example, the BS 110 may transmit synchronization signal blocks based at least in part on a synchronization raster which may identify particular resources in which the BS 110 is to transmit synchronization signal blocks. In some aspects, the BS 110 may transmit a synchronization signal block in an off-raster location (e.g., a location not identified by the synchronization raster). For example, the BS 110 may transmit the synchronization signal block in the off-raster location to enable the UE 120 to determine mobility information for mobility management. The techniques and apparatuses described herein are applicable for off-raster synchronization as well as for synchronization according to the synchronization raster. For example, the UE 120 may determine the resource allocation based at least in part on the synchronization signal block (e.g., based at least in part on a reference frequency identified by the synchronization signal block) irrespective of whether the synchronization signal block is on or off the synchronization raster.

In some aspects, a change in channel number can be observed as a continuous phase rotation of the transmitted signal (e.g., the carrier information). This may be based at least in part on the Fourier transform used to generate the transmitted signal. Additionally, a change in $k_0$ may be observed as a phase rotation of the transmitted signal that may reset at every signal boundary.

By determining the physical channel, the tone boundary offset, the channel start, and/or the channel end, the UE 120 determines the configuration of the channel. In this way, the UE 120 determines the configuration without explicit signaling of certain parameters of the configuration (e.g., the channel start, the channel end, a center frequency of the carrier, etc.), which improves efficiency of signaling the carrier information and improves utilization of network resources.

As indicated above, FIG. 6 is provided as an example. Other examples are possible and may differ from what was described with respect to FIG. 6.

FIG. 7 is a diagram illustrating an example process 700 performed, for example, by a UE, in accordance with various aspects of the present disclosure. Example process 700 is an example where a UE (e.g., UE 120) performs a determination of a configuration for a carrier based at least in part on carrier information.

As shown in FIG. 7, in some aspects, process 700 may include receiving carrier information identifying at least one of an initial absolute frequency for a carrier, a tone boundary offset value for the carrier, a number of resource blocks included in the carrier, or a frequency offset from a reference frequency (block 710). For example, the UE may receive carrier information from a BS (e.g., BS 110). The UE may receive the carrier information to determine a configuration for a carrier or BWP of the UE. The carrier information may identify at least one of an initial absolute frequency for the carrier, a tone boundary offset value for the carrier, a number of resource blocks included in the carrier, or a frequency offset from a reference frequency. For example, the carrier information may identify the initial absolute frequency, the tone boundary offset value, the number of resource blocks, and the frequency offset. The initial absolute frequency may identify a frequency relative to which the carrier or BWP is defined (e.g., based at least in part on the tone boundary offset value, the frequency offset, and/or the like).

As shown in FIG. 7, in some aspects, process 700 may include determining a configuration of the carrier based at least in part on the carrier information and a subcarrier spacing of the UE (block 720). For example, the UE may determine a configuration of the carrier. The UE may determine the configuration using the carrier information. For example, the UE may know the subcarrier spacing of the UE, and may use the carrier information, based at least in part on the subcarrier spacing, to determine the configuration.

Process 700 may include additional aspects, such as any single aspect and/or any combination of aspects described below and/or in connection with one or more other processes described elsewhere herein.

In some aspects, the reference frequency is located a particular distance from an edge of the carrier, wherein the particular distance is wider than a maximum supported channel bandwidth of the UE. In some aspects, the UE may determine, based at least in part on the reference frequency, at least one of a pseudo-noise sequence for the carrier, a resource block group for the carrier, a precoder resource block granularity for the carrier, or a location of a sounding reference signal for the carrier.

In some aspects, the UE may determine a bandwidth part based at least in part on the carrier information and based at least in part on information identifying at least one of a starting resource block of the bandwidth part or an ending resource block of the bandwidth part. In some aspects, at least one of the starting resource block of the bandwidth part or the ending resource block of the bandwidth part are defined relative to the physical channel. In some aspects, at least one of the starting resource block of the bandwidth part or the ending resource block of the bandwidth part are defined relative to the reference frequency.

In some aspects, the carrier is a downlink carrier and the carrier information is downlink carrier information, and, when the UE is associated with frequency division duplexing, the UE may receive uplink carrier information for an uplink carrier; and determine a configuration of the uplink carrier based at least in part on the uplink carrier information. In some aspects, the UE is configured to receive the uplink carrier information based at least in part on the uplink carrier being associated with at least one of a different subcarrier spacing than the downlink carrier, or a different channel bandwidth than the downlink carrier.

In some aspects, when subcarrier spacings of the downlink carrier and the uplink carrier are equal and when channel bandwidths of the downlink carrier and the uplink carrier are equal, the uplink carrier information identifies a channel number of the uplink carrier. In some aspects, a synchronization signal block for the carrier is received in a location other than a location defined by a synchronization raster for the physical channel.

In some aspects, the UE may identify the initial absolute frequency based at least in part on one of: receiving a channel number indicating the initial absolute frequency, or detecting a synchronization channel at the initial absolute frequency.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station (BS), in accordance with various aspects of the present disclosure. Example process 800 is an example where a base station (e.g., BS 110) performs signaling of carrier information in a 5G network.

As shown in FIG. 8, in some aspects, process 800 may include determining a configuration of a carrier for a UE based at least in part on a subcarrier spacing of the UE (block 810). For example, the base station may determine a configuration for a carrier. In some aspects, the base station may determine the configuration for a bandwidth part of the UE (e.g., that is included in the carrier). In some aspects, the base station may determine the configuration based at least in part on a subcarrier spacing of the UE.

As shown in FIG. 8, in some aspects, process 800 may include transmitting carrier information identifying the configuration (block 820). For example, the base station may transmit carrier information to the UE. The carrier information may identify the configuration and/or may be used by the UE to determine the configuration. For example, the carrier information may include at least one of an initial absolute frequency for the carrier, a tone boundary offset value for the carrier, a number of resource blocks included in the carrier, or a frequency offset from a reference frequency.

Process 800 may include additional aspects, such as any single aspect and/or any combination of aspects described below and/or in connection with one or more other processes described elsewhere herein.

In some aspects, the reference frequency is located a particular distance from an edge of the carrier, wherein the particular distance is wider than a maximum supported channel bandwidth of the UE. In some aspects, the base station may transmit information identifying at least one of a starting resource block of a bandwidth part or an ending resource block of the bandwidth part, wherein the carrier information is for the bandwidth part. In some aspects, at least one of the starting resource block of the bandwidth part or the ending resource block of the bandwidth part are defined relative to the physical channel. In some aspects, at least one of the starting resource block of the bandwidth part or the ending resource block of the bandwidth part are defined relative to the reference frequency. In some aspects, the carrier is a downlink carrier and the carrier information is downlink carrier information. When the UE is associated with frequency division duplexing, the base station may transmit uplink carrier information for an uplink carrier. In some aspects, the base station is configured to transmit the uplink carrier information based at least in part on the uplink carrier being associated with at least one of: a different subcarrier spacing than the downlink carrier, or a different channel bandwidth than the downlink carrier.

In some aspects, when subcarrier spacings of the downlink carrier and the uplink carrier are equal and when channel bandwidths of the downlink carrier and the uplink carrier are equal, the uplink carrier information identifies a channel number of the uplink carrier. In some aspects, a synchronization signal block for the carrier is received in a location other than a location defined by a synchronization raster for the physical channel. In some aspects, the initial absolute frequency is identified based at least in part on one of: a channel number indicating the initial absolute frequency, or a synchronization channel at the initial absolute frequency.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving carrier information identifying a frequency offset;
   identifying a subcarrier spacing supported by the UE;
   identifying a reference frequency based at least in part on a synchronization signal block or a physical broadcast channel (PBCH) received by the UE,
      wherein the reference frequency is located a particular distance from an edge of a carrier, and
      wherein the particular distance is wider than a maximum supported channel bandwidth of the UE; and
   determining a configuration of the carrier based at least in part on the subcarrier spacing supported by the UE, the reference frequency, and the frequency offset,
      wherein determining the configuration of the carrier further comprises:
         determining, based at least in part on the reference frequency, at least one of:
            a pseudo-noise sequence for the carrier,
            a resource block group for the carrier,
            a precoder resource block granularity for the carrier, or
            a location of a sounding reference signal for the carrier.

2. The method of claim 1, further comprising:
   determining a bandwidth part based at least in part on the carrier information and based at least in part on information identifying at least one of a starting resource block of the bandwidth part or an ending resource block of the bandwidth part.

3. The method of claim 2, wherein at least one of the starting resource block of the bandwidth part or the ending resource block of the bandwidth part are defined relative to a physical channel.

4. The method of claim 2, wherein at least one of the starting resource block of the bandwidth part or the ending resource block of the bandwidth part are defined relative to the reference frequency.

5. The method of claim 1, wherein the carrier is a downlink carrier and the carrier information is downlink carrier information, and
   wherein, when the UE is associated with frequency division duplexing, the method further comprises:
      receiving uplink carrier information for an uplink carrier; and
      determining a configuration of the uplink carrier based at least in part on the uplink carrier information.

6. The method of claim 5, wherein the UE is configured to receive the uplink carrier information based at least in part on the uplink carrier being associated with at least one of:
   a different subcarrier spacing than the downlink carrier, or
   a different channel bandwidth than the downlink carrier.

7. The method of claim 1, wherein a synchronization signal block for the carrier is received in a location other than a location defined by a synchronization raster for a physical channel.

8. The method of claim 1, further comprising:
   identifying an initial absolute frequency, for the carrier, based at least in part on one of:
      receiving a channel number indicating the initial absolute frequency, or
      detecting a synchronization channel at the initial absolute frequency.

9. The method of claim 1, wherein the subcarrier spacing supported by the UE is identified based on at least in part on a configuration of the UE.

10. The method of claim 1, wherein the carrier information is received from a base station.

11. The method of claim 1,
wherein the carrier information includes a channel number that includes an identifier of a physical channel, and
wherein the configuration is determined further based on the channel number.

12. A user equipment (UE) for wireless communication, comprising:
a memory; and
one or more processors coupled to the memory, the memory and the one or more processors configured to:
receive carrier information identifying a frequency offset;
identify a subcarrier spacing supported by the UE;
identify a reference frequency based at least in part on a synchronization signal block or a physical broadcast channel (PBCH) received by the UE,
wherein the reference frequency is located a particular distance from an edge of a carrier, and
wherein the particular distance is wider than a maximum supported channel bandwidth of the UE; and
determine a configuration of the carrier based at least in part on the subcarrier spacing supported by the UE, the reference frequency, and the frequency offset,
wherein, when determining the configuration of the carrier, the one or more processors are configured to:
determine, based at least in part on the reference frequency, at least one of:
a pseudo-noise sequence for the carrier,
a resource block group for the carrier,
a precoder resource block granularity for the carrier, or
a location of a sounding reference signal for the carrier.

13. The UE of claim 12, wherein the one or more processors are further configured to:
determine a bandwidth part based at least in part on the carrier information and based at least in part on information identifying at least one of a starting resource block of the bandwidth part or an ending resource block of the bandwidth part.

14. The UE of claim 13, wherein at least one of the starting resource block of the bandwidth part or the ending resource block of the bandwidth part are defined relative to a physical channel.

15. The UE of claim 13, wherein at least one of the starting resource block of the bandwidth part or the ending resource block of the bandwidth part are defined relative to the reference frequency.

16. The UE of claim 12, wherein the carrier is a downlink carrier and the carrier information is downlink carrier information, and
wherein, when the UE is associated with frequency division duplexing, the one or more processors are further configured to:
receive uplink carrier information for an uplink carrier; and
determine a configuration of the uplink carrier based at least in part on the uplink carrier information.

17. The UE of claim 16, wherein the UE is configured to receive the uplink carrier information based at least in part on the uplink carrier being associated with at least one of:
a different subcarrier spacing than the downlink carrier, or
a different channel bandwidth than the downlink carrier.

18. The UE of claim 12, wherein a synchronization signal block is received in a location other than a location defined by a synchronization raster for a physical channel.

19. The UE of claim 12, wherein the one or more processors are to:
identify an initial absolute frequency based at least in part on one of:
receiving a channel number indicating the initial absolute frequency, or
detecting a synchronization channel at the initial absolute frequency.

20. The UE of claim 12, wherein the subcarrier spacing supported by the UE is identified based on at least in part on a configuration of the UE.

21. The UE of claim 12, wherein the carrier information is received from a base station.

22. The UE of claim 12,
wherein the carrier information includes a channel number that includes an identifier of a physical channel, and
wherein the configuration is determined further based on the channel number.

23. A method of wireless communication performed by a base station, comprising:
identifying a particular subcarrier spacing associated with a user equipment (UE);
determining a configuration of a carrier for a user equipment (UE) based at least in part on the particular subcarrier spacing associated with the UE;
transmitting, to the UE, carrier information identifying the configuration,
wherein the carrier information includes a frequency offset,
wherein the frequency offset is from a reference frequency that is identified based on a synchronization signal block or a physical broadcast channel (PBCH) received by the UE,
wherein the reference frequency is located a particular distance from an edge of the carrier, and
wherein the particular distance is wider than a maximum supported channel bandwidth of the UE; and
transmitting information identifying at least one of a starting resource block of a bandwidth part or an ending resource block of the bandwidth part, wherein the carrier information is for the bandwidth part.

24. The method of claim 23, wherein at least one of the starting resource block of the bandwidth part or the ending resource block of the bandwidth part are defined relative to a physical channel.

25. The method of claim 23, wherein at least one of the starting resource block of the bandwidth part or the ending resource block of the bandwidth part are defined relative to the reference frequency.

26. The method of claim 23, wherein the carrier is a downlink carrier and the carrier information is downlink carrier information, and
wherein, when the UE is associated with frequency division duplexing, the method further comprises:
transmitting uplink carrier information for an uplink carrier.

27. The method of claim 26, wherein the base station is configured to transmit the uplink carrier information based at least in part on the uplink carrier being associated with at least one of:
a different subcarrier spacing than the downlink carrier, or
a different channel bandwidth than the downlink carrier.

28. The method of claim 23, wherein a synchronization signal block for the carrier is received in a location other than a location defined by a synchronization raster for a physical channel.

29. The method of claim 23, wherein the carrier information further includes an initial absolute frequency that is identified based at least in part on one of:
- a channel number indicating the initial absolute frequency, or
- a synchronization channel at the initial absolute frequency.

30. A base station for wireless communication, comprising:
- a memory; and
- one or more processors coupled to the memory, the memory and the one or more processors configured to:
  - identify a particular subcarrier spacing associated with a user equipment (UE);
  - determine a configuration of a carrier for the UE based at least in part on the particular subcarrier spacing associated with the UE;
  - transmit, to the UE, carrier information identifying the configuration,
    - wherein the carrier information includes a frequency offset,
    - wherein the frequency offset is from a reference frequency that is identified based on a synchronization signal block or a physical broadcast channel (PBCH) received by the UE,
    - wherein the reference frequency is located a particular distance from an edge of the carrier, and
    - wherein the particular distance is wider than a maximum supported channel bandwidth of the UE; and
  - transmit information identifying at least one of a starting resource block of a bandwidth part or an ending resource block of the bandwidth part, wherein the carrier information is for the bandwidth part.

31. The method of claim 23, wherein the carrier information further includes a channel number that includes an identifier of a physical channel.

32. The base station of claim 30, wherein at least one of the starting resource block of the bandwidth part or the ending resource block of the bandwidth part are defined relative to a physical channel.

33. The base station of claim 30, wherein at least one of the starting resource block of the bandwidth part or the ending resource block of the bandwidth part are defined relative to the reference frequency.

34. The base station of claim 30, wherein the carrier is a downlink carrier and the carrier information is downlink carrier information, and
- wherein, when the UE is associated with frequency division duplexing, the one or more processors are further configured to:
  - transmit uplink carrier information for an uplink carrier.

35. The base station of claim 34, wherein the base station is configured to transmit the uplink carrier information based at least in part on the uplink carrier being associated with at least one of:
- a different subcarrier spacing than the downlink carrier, or
- a different channel bandwidth than the downlink carrier.

36. The base station of claim 30, wherein a synchronization signal block for the carrier is received in a location other than a location defined by a synchronization raster for a physical channel.

37. The base station of claim 30, wherein the carrier information further includes an initial absolute frequency that is identified based at least in part on one of:
- a channel number indicating the initial absolute frequency, or
- a synchronization channel at the initial absolute frequency.

38. The base station of claim 30, wherein the carrier information further includes a channel number that includes an identifier of a physical channel.

* * * * *